(12) United States Patent
Chen et al.

(10) Patent No.: US 12,228,817 B2
(45) Date of Patent: Feb. 18, 2025

(54) DISPLAY DEVICE AND CONTROL METHOD THEREFOR

(71) Applicants: Fuzhou BOE Optoelectronics Technology Co., Ltd., Fujian (CN); BOE Technology Group Co., Ltd., Beijing (CN)

(72) Inventors: Ming Chen, Beijing (CN); Nani Liu, Beijing (CN); Kai Diao, Beijing (CN); Han Zhang, Beijing (CN); Long Hu, Beijing (CN); Hongyu Zhao, Beijing (CN); Siyu Wu, Beijing (CN); Jingran Niu, Beijing (CN); Jiwei Sun, Beijing (CN); Yuhang Lin, Beijing (CN); Dingjie Zheng, Beijing (CN)

(73) Assignees: Fuzhou BOE Optoelectronics Technology Co., Ltd., Fujian (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/021,727

(22) PCT Filed: Apr. 29, 2022

(86) PCT No.: PCT/CN2022/090500
§ 371 (c)(1),
(2) Date: Feb. 16, 2023

(87) PCT Pub. No.: WO2023/206441
PCT Pub. Date: Nov. 2, 2023

(65) Prior Publication Data
US 2024/0264486 A1     Aug. 8, 2024

(51) Int. Cl.
*G02F 1/00*         (2006.01)
*G02F 1/13357*      (2006.01)

(52) U.S. Cl.
CPC .............. *G02F 1/133603* (2013.01)

(58) Field of Classification Search
None
See application file for complete search history.

(56) References Cited

U.S. PATENT DOCUMENTS

2007/0147088 A1    6/2007  Chien et al.
2009/0168455 A1*   7/2009  Kim ................. G02F 1/133615
                                                   362/613

(Continued)

FOREIGN PATENT DOCUMENTS

CN    206557507 U    10/2017
CN    209992781 U    1/2020

(Continued)

*Primary Examiner* — Gerald J Sufleta, II
(74) *Attorney, Agent, or Firm* — IPro, PLLC

(57) ABSTRACT

A display device and a control method therefor are disclosed. The display device includes: a first backlight module; a second backlight module located at a light emergent side of the first backlight module; and a display panel located at a side of the second backlight module facing away from the first backlight module; where the first backlight module includes a first light board, and the first light board emits light to a side of the second backlight module; the second backlight module includes at least one second light board, second light boards of the at least one second light board are stacked, and the second light boards transmit the light emitted by the first backlight module and emit light to the display panel; the first light board includes a plurality of first light sources, each second light board of the second light boards includes a plurality of second light sources.

19 Claims, 10 Drawing Sheets

(56) References Cited

U.S. PATENT DOCUMENTS

| | | | |
|---|---|---|---|
| 2015/0323164 A1 | 11/2015 | Kwon et al. | |
| 2019/0155105 A1* | 5/2019 | Aieta | G02B 6/0036 |
| 2020/0103582 A1* | 4/2020 | Fattal | G02F 1/133605 |
| 2020/0168169 A1* | 5/2020 | Yoda | G09G 3/3648 |
| 2021/0390914 A1 | 12/2021 | Fattal | |
| 2022/0075111 A1* | 3/2022 | Yamashita | G02B 6/0068 |

FOREIGN PATENT DOCUMENTS

| | | |
|---|---|---|
| CN | 113035848 A | 6/2021 |
| CN | 215867454 U | 2/2022 |
| JP | 2008098037 A | 4/2008 |
| KR | 20060092385 A | 8/2006 |
| KR | 101569209 B1 | 11/2015 |
| TW | I321694 B | 3/2010 |
| TW | 202040210 A | 11/2020 |

\* cited by examiner

DISPLAY DEVICE AND CONTROL METHOD THEREFOR

This application is a National Stage of International Application No. PCT/CN2022/090500, filed on Apr. 29, 2022, which is hereby incorporated by reference in its entirety.

FIELD

The present disclosure relates to the technical field of displays, and particularly to a display device and a control method therefor.

BACKGROUND

With development of economy and dramatic improvement in information technology, a high-performance display device for information interaction, especially a display device capable of providing ultra-high brightness and ultra-high dynamic contrast, wins increasing popularity among consumers. This type of display device has been widely applied to outdoor high-ambient-brightness occasions or image design and processing occasions.

As a mainstream display device at present, a liquid crystal display (LCD for short) has advantages of low power consumption, small size, low radiation, etc. A liquid crystal display panel is a non-self-luminous panel and is used in conjunction with a backlight module. The backlight module is divided into a direct-lit backlight module and an edge-lit backlight module. The direct-lit backlight module uses a light board as a backlight source while the edge-lit backlight module uses a light strip as a backlight source.

In order to improve the image contrast, the LCD cooperates with local dimming (LD) technology of the backlight module. In order to achieve the high dynamic contrast range (HDR) image display, it is necessary to increase the quantity of partitions of light sources on the light board or the light strip. In order to achieve higher brightness, it is necessary to increase the density of the light sources. However, due to a limited area of the light board or the light strip, the density of the light sources cannot further increase when reaching a certain level. Besides, in the case of an excess of light sources on the light board or the light strip, heat increase will be caused, resulting in overheating of a device system and further a device failure.

SUMMARY

According to a first aspect of an embodiment of the present disclosure, a display device is provided, and includes: a first backlight module; a second backlight module, located at a light emergent side of the first backlight module; and a display panel, located at a side of the second backlight module facing away from the first backlight module; where: the first backlight module includes a first light board, and the first light board emits light to a side of the second backlight module; the second backlight module includes at least one second light board, second light boards of the at least one second light board are stacked, and the second light boards transmit the light emitted by the first backlight module and emit light to the display panel; and the first light board includes a plurality of first light sources, each second light board of the second light boards includes a plurality of second light sources, and orthographic projections of the first light sources and the second light sources on the display panel do not overlap each other.

In some embodiments of the present disclosure, the first light board is divided into a plurality of first partitions, each first partition of the first partitions includes at least one first light source, and the first partitions are driven independently; and each second light board of the second light boards is divided into a plurality of second partitions, each second partition of the second partitions includes at least one second light source, and the second partitions are driven independently.

In some embodiments of the present disclosure, orthographic projections of the first partition of the first light board and the second partition of the at least one second light board on the display panel have an overlapped area.

In some embodiments of the present disclosure, the first light sources in the first light board are arranged into a plurality of first light source rows and a plurality of second light source rows, the first light source rows and the second light source rows extend in a first direction and are arranged in a second direction, and the first direction and the second direction intersect with each other; the first light source rows and the second light source rows are alternately arranged in the second direction, and the second light source rows are staggered relative to the first light source rows adjacent thereto in the first direction; and the second light sources in each second light board of the second light boards are arranged in an array in the first direction and the second direction.

In some embodiments of the present disclosure, the second light sources in the at least one second light board in the second backlight module are arranged into a plurality of third light source rows and a plurality of fourth light source rows, the third light source rows and the fourth light source rows extend in a first direction and are arranged in a second direction, and the first direction and the second direction intersect with each other; the third light source rows and the fourth light source rows are alternately arranged in the second direction, and the fourth light source rows are staggered relative to the third light source rows adjacent thereto in the first direction; the second light sources in a remaining second light board in the second backlight module are arranged in an array in the first direction and the second direction; and the first light sources in the first light board are arranged in an array in the first direction and the second direction.

In some embodiments of the present disclosure, the first backlight module further includes: a light collimator, located at a light emergent side of the first light board, the light collimator collimating the light emitted by the first light board.

In some embodiments of the present disclosure, the light collimator is a grating or a Fresnel lens film.

In some embodiments of the present disclosure, the second backlight module further includes: an optical film, located between any two second light boards adjacent to each other, and the optical film includes one or more of a light guide diffusion plate, a prismatic lens or a diffusion sheet.

In some embodiments of the present disclosure, the second light board further includes: a second drive substrate, the second light sources being located on the second drive substrate and being electrically connected to the second drive substrate; and a protective layer, covering the second light sources and the second drive substrate; where: the second drive substrate includes a second substrate and a second drive wire layer located on the second substrate; the second substrate is made of transparent glass or transparent resin; and a wire in the second drive wire layer has a thickness in a range of 0.3 µm to 1 µm, and the wire in the second drive wire layer has a width in a range of 3 µm to 15 µm.

In some embodiments of the present disclosure, each of the first light sources has a greater size than each of the second light sources.

In some embodiments of the present disclosure, the second backlight module includes a plurality of the second light boards, and a second light source at a side of a second light board close to the display panel has a smaller size than a second light source at a side of a second light board far away from the display panel.

In some embodiments of the present disclosure, an emergent surface of each of the second light sources in the each second light board in the second backlight module is parallel to the second drive substrate, such that a divergence angle of emergent light of each of the second light sources is symmetrical relative to a normal perpendicular to the second light board.

In some embodiments of the present disclosure, the second light sources in the at least one second light board in the second backlight module are at least divided into a first type of second light source and a second type of second light source; and each of the first type of second light source and the second type of second light source includes: a support electrically connected to the second drive substrate, the support being recessed towards a side of the second drive substrate to form an accommodation space; and a light-emitting chip located in the accommodation space of the support; where: a surface of the support for fixing the light-emitting chip is not parallel to the second drive substrate, such that a divergence angle of emergent light of the first type of second light source and a divergence angle of emergent light of the second type of second light source incline relative to a normal perpendicular to the second light board; and a surface of the first type of second light source for fixing the light-emitting chip inclines towards a first side, a surface of the second type of second light source for fixing the light-emitting chip inclines towards the second side, and the first side and the second side are two opposite sides of the normal perpendicular to the second light board.

In some embodiments of the present disclosure, the second light sources in the at least one second light board in the second backlight module further include a third type of second light source; a light emergent surface of the third type of second light source is parallel to the second drive substrate, such that a divergence angle of emergent light of the third type of second light source is symmetrical relative to the normal perpendicular to the second light board.

In some embodiments of the present disclosure, a first type of second light source, a second type of second light source and a third type of second light source constitute a second light source group, the second light board includes a plurality of second light source groups, and the second light source groups are arranged in an array; and in a same second light source group, the third type of second light source is located between the first type of second light source and the second type of second light source.

In some embodiments of the present disclosure, the second backlight module at least includes two types of second light boards, that is a first type of second light board and a second type of second light board, each of second light sources of the first type of second light board is a first type of second light source, and each of second light sources of the second type of second light board is a second type of second light source; and each of the first type of second light source and the second type of second light source includes: a support electrically connected to the second drive substrate, the support being recessed towards a side of the second drive substrate to form an accommodation space; and a light-emitting chip located in the accommodation space of the support; where: a surface of the support for fixing the light-emitting chip is not parallel to the second drive substrate, such that a divergence angle of emergent light of the first type of second light source and a divergence angle of emergent light of the second type of second light source incline relative to a normal perpendicular to the second light board; and a surface of the first type of second light source for fixing the light-emitting chip inclines towards a first side, a surface of the second type of second light source for fixing the light-emitting chip inclines towards a second side, and the first side and the second side are two opposite sides of the normal perpendicular to the second light board.

In some embodiments of the present disclosure, the second backlight module further includes a third type of second light board, and each of second light sources of the third type of second light board is a third type of second light source; and a light emergent surface of the third type of second light source is parallel to the second drive substrate, such that a divergence angle of emergent light of the third type of second light source is symmetrical relative to the normal perpendicular to the second light board.

According to a second aspect of an embodiment of the present disclosure, a control method for a display device is provided, and includes: determining a brightness level of the display device selected by a user; determining a light board to be activated according to the brightness level and a predetermined correspondence between the brightness level and the light board; determining brightness of partitions in the light board to be activated according to brightness distribution of an image to be displayed; and driving a light source in a corresponding partition to provide backlight for a display panel according to determined brightness of the partitions.

In some embodiments of the present disclosure, a first backlight module emits collimated light, and a divergence angle of emergent light of the second backlight module is symmetrical relative to a normal perpendicular to a second light board; and the control method further includes: determining a display mode of the display device selected by the user, the display mode including a wide-view angle display mode and a privacy display mode; activating the first backlight module and the second backlight module simultaneously in a case that a determined display mode is the wide-view angle display mode; and activating the first backlight module and deactivating the second backlight module in a case that a determined display mode is the privacy display mode.

In some embodiments of the present disclosure, second light sources in at least one second light board in a second backlight module are at least divided into a first type of second light source and a second type of second light source, or the second backlight module at least includes a first type of second light board and a second type of second light board; and the control method further includes: determining a view angle of the display selected by the user; determining a light source to be activated according to the view angle and a predetermined correspondence between the view angle and the light source; and turning on a determined light source to be activated to provide the backlight for the display panel.

BRIEF DESCRIPTION OF THE DRAWINGS

In order to describe technical solutions in embodiments of the present disclosure more clearly, accompanying drawings required by embodiments of the present disclosure are briefly described below. Apparently, the accompanying drawings in the following description are merely some embodiments of the present disclosure, and a person of ordinary skill in the art can further derive other accompanying drawings from these accompanying drawings without creative efforts.

DETAILED DESCRIPTION OF EMBODIMENTS

Figure 1:
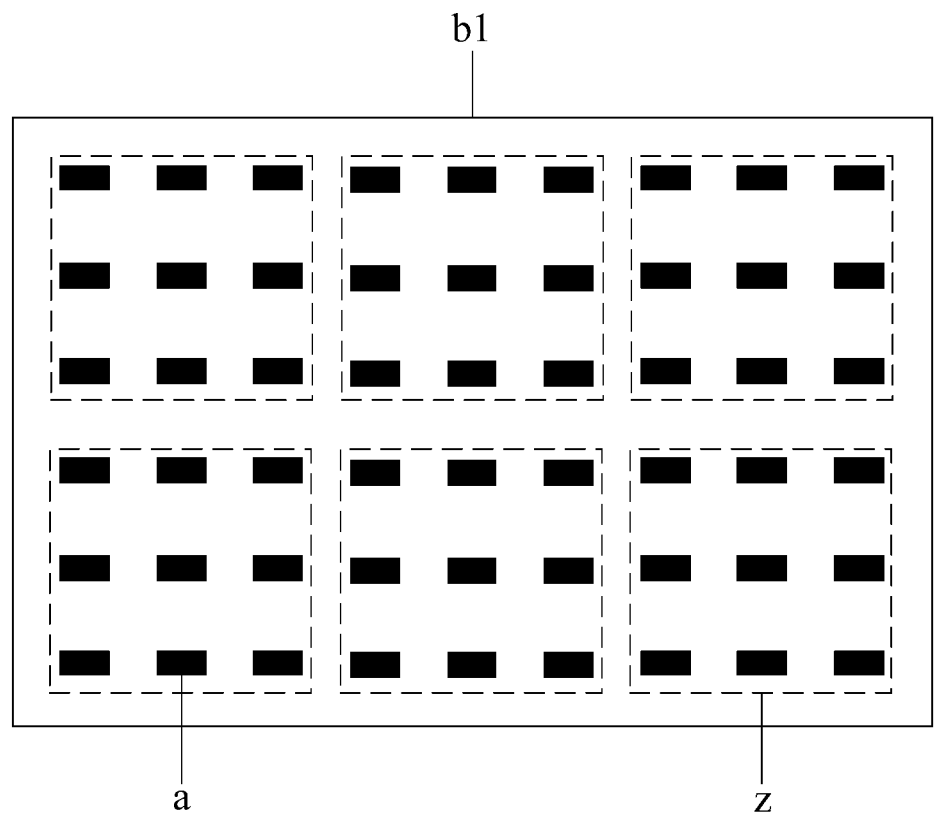
FIG. 1 is a schematic structural diagram of a front view of a direct-lit backlight module in the related art.

In order to make objective, features, and advantages of the present disclosure clearer and more comprehensible, the present disclosure will be further described in detail below in conjunction with accompanying drawings and embodiments. However, illustrative implementations can be implemented in many forms and should not be interpreted as being limited to the implementations set forth herein; but instead, these implementations are provided such that the present disclosure will be more thorough and complete, and the concept of the illustrative implementations will be fully conveyed to those skilled in the art.

In the drawings, the same reference numerals indicate the same or similar structures, and therefore repeated description thereof is omitted. The words expressing positions and directions described in the present disclosure are all illustrated by taking the accompanying drawings as examples, but can also be modified according to needs, and all modifications shall fall within the protection scope of the present disclosure. The accompanying drawings of the present disclosure are merely used for illustrating relative positional relations rather than representing true proportions.

As a mainstream display device at present, a liquid crystal display (LCD) has advantages of low power consumption, small size, low radiation, etc. A liquid crystal display panel is a non-self-luminous panel and needs to be used in conjunction with a backlight module. The liquid crystal display panel is a transmissive display panel. The backlight module is located at an incident side of the liquid crystal display panel, and provides backlight for the backlight module. By controlling a flipping degree of a liquid crystal in the liquid crystal display panel, varied transmittance may be achieved, to achieve gray scale display.

The backlight module is divided into a direct-lit backlight module and an edge-lit backlight module. The direct-lit backlight module uses a light board as a backlight source while the edge-lit backlight module uses a light strip as a backlight source. In order to achieve the high dynamic contrast range image display, the backlight module may cooperate with local dimming technology for image display, to significantly reduce dark field brightness and improve image contrast.

FIG. 1 is a schematic structural diagram of a front view of a direct-lit backlight module in the related art.

As shown in FIG. 1, the direct-lit backlight module uses a light board b1 as a backlight source, the light board b1 includes a plurality of light sources a arranged in an array, and the light sources a are divided into a plurality of partitions z according to a certain quantity. A display device may independently control the partitions z of the light board according to brightness degrees of different zones of a displayed picture, thus archiving image display with high dynamic contrast.

Figure 2:
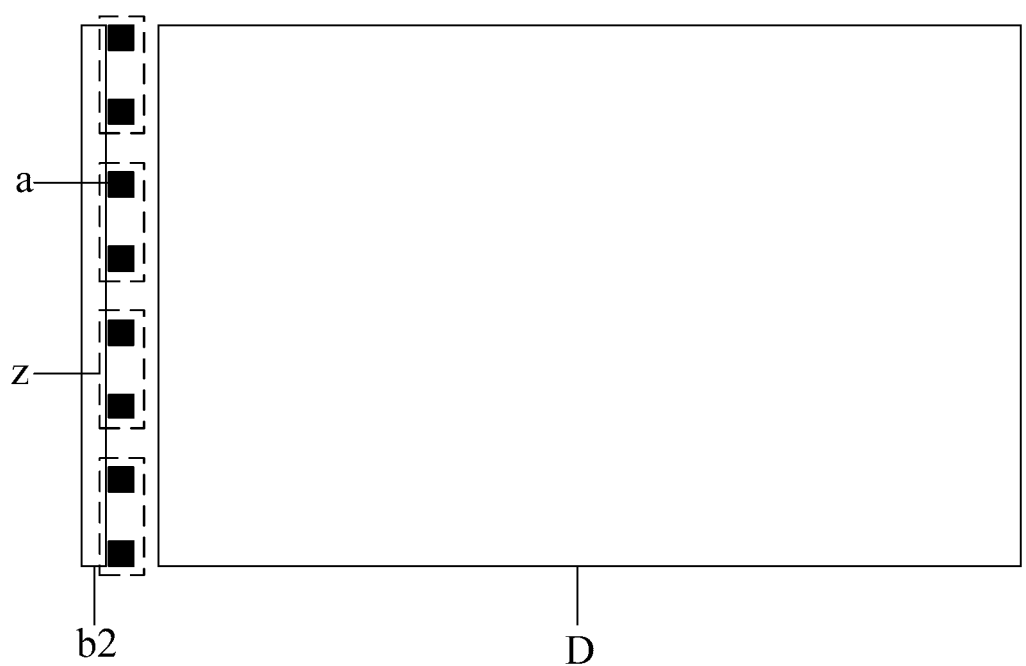
FIG. 2 is a schematic structural diagram of a front view of an edge-lit backlight module in the related art.

FIG. 2 is a schematic structural diagram of a front view of an edge-lit backlight module in the related art.

As shown in FIG. 2, the edge-lit backlight module uses a light strip b2 as a backlight source, and a light guide plate D is further arranged at a light emergent side of the light strip b2. The light guide plate D conducts emergent light of the light strip b2 through total reflection of the light. The light strip b2 includes a plurality of light sources a, and the light sources a are divided into a plurality of partitions z according to a certain quantity. A display device may independently control the partitions z of the light strip according to brightness degrees of different zones of a displayed picture, thus achieving image display with high dynamic contrast.

Despite the form of backlight module used, in order to achieve better high dynamic contrast, it is necessary to increase the quantity of partitions of light sources on the light board or the light strip. For higher brightness, it is necessary to increase the quantity of light sources, resulting in an increase in an arrangement density of the light sources. However, due to a limited area of the light board or the light strip, the density of the light sources cannot further increase when reaching a certain level. Besides, in the case of an excess of light sources on the light board or the light strip, heat increase will be caused, resulting in overheating of a device system and further a device failure.

In view of this, an embodiment of the present disclosure provides a display device which may break the limitation of a partition of a light source in the related art and further improve fineness of the partition of the light source.

Figure 3:
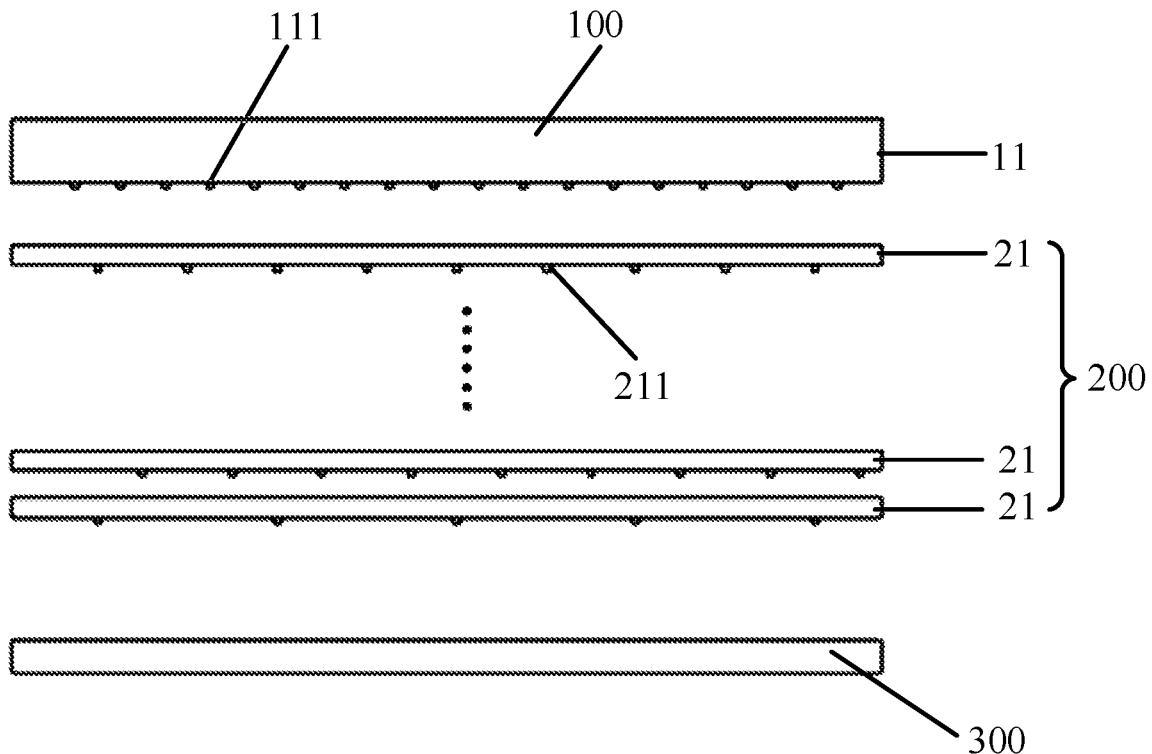
FIG. 3 is a first schematic structural diagram of a side view of a display device according to an embodiment of the present disclosure.

FIG. 3 is a first schematic structural diagram of a side view of a display device according to an embodiment of the present disclosure.

As shown in FIG. 3, the display device according to an embodiment of the present disclosure includes a first backlight module 100, a second backlight module 200 and a display panel 300.

The second backlight module 200 is located at a light emergent side of the first backlight module 100, and the display panel 300 is located at a side of the second backlight module 200 facing away from the first backlight module 100.

The first backlight module 100 includes a first light board 11, and the first light board 11 emits light to a side of the second backlight module 200. The second backlight module 200 includes at least one second light board 21, second light boards 21 of the at least one second light board are stacked, and the second light boards 21 transmit the light emitted by the first backlight module 100 and emit the light to the display panel 300.

In an embodiment of the present disclosure, each of the second light boards 21 is a transmissive light board, and may not only provide backlight for the display panel, but also transmit light emitted from a rear light board. The backlight brightness may be greatly improved by stacking two backlight modules and stacking a plurality of light boards.

In an embodiment of the present disclosure, as shown in FIG. 3, the first light board 11 includes a plurality of first light sources 111, each second light board of the second light boards 21 includes a plurality of second light sources 211, and orthographic projections of the first light sources 111 and the second light sources 211 on the display panel 300 do not overlap each other. In this way, an arrangement rule of the light sources on the light boards may be used to increase the arrangement density of the light sources, such that the light sources may be divided into more partitions, more precise local dimming control may be achieved, and better high-dynamic image display may be facilitated.

Optionally, the first light board 11 may be applied to direct-lit backlight, and in this case, the first light board 11 includes a plurality of first light sources 111 arranged in an array. The first light sources 111 are divided into a plurality of partitions, and the first light sources in each partition may be controlled independently.

Optionally, the first light board 11 may be applied to edge-lit backlight. In this case, the first light sources 111 may be arranged in a row, and a light guide plate and one or more optical films are arranged at light emergent sides of the first light sources 111 to improve backlight uniformity. The first light sources 111 are divided into a plurality of partitions, and the first light sources in each partition may be controlled independently.

In an actual application, an appropriate form of the first backlight module may be selected according to actual requirements, which is not limited herein in embodiments of the present disclosure.

Figure 4:
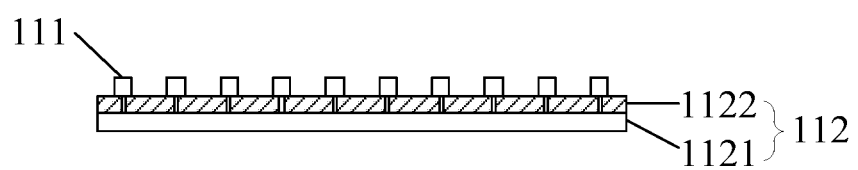
FIG. 4 is a schematic structural diagram of a side view of a first light board according to an embodiment of the present disclosure.

FIG. 4 is a schematic structural diagram of a side view of a first light board according to an embodiment of the present disclosure.

As shown in FIG. 4, the first light board includes a first drive substrate 112 and first light sources 111 located on the first drive substrate 112. The first light sources 111 are electrically connected to the first drive substrate 112, and the first drive substrate 112 provides drive signals for the first light sources 111.

The first drive substrate 112 includes a first substrate 1121 and a first drive wire layer 1122 located on the first substrate. In an embodiment of the present disclosure, the first drive substrate 112 may use a printed circuit board (PCB) or an array substrate commonly used in a liquid crystal display panel and an organic light-emitting diode display panel. In a case that the first drive substrate 112 uses the PCB, the first substrate 1121 may be made of aluminum, copper, FR4 material or glass. In a case that the first drive substrate 112 uses the array substrate, the first substrate 1121 may be made of glass, etc., which is not limited herein.

During specific implementation, the first light board 11 may use the LED light board commonly used in the backlight module in the related art, the first light source 111 may use the light-emitting diode (LED for short), the LED has the advantages of high brightness, a high response speed, energy saving, etc., and a manufacturing process of the LED light board is mature. The use of the LED light board for the first light board 11 may effectively control cost and has high brightness.

Figure 5:
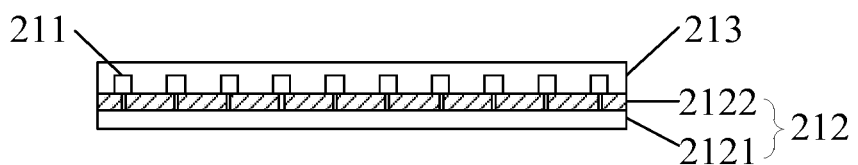
FIG. 5 is a first schematic structural diagram of a side view of a second light board according to an embodiment of the present disclosure.
Figure 6:
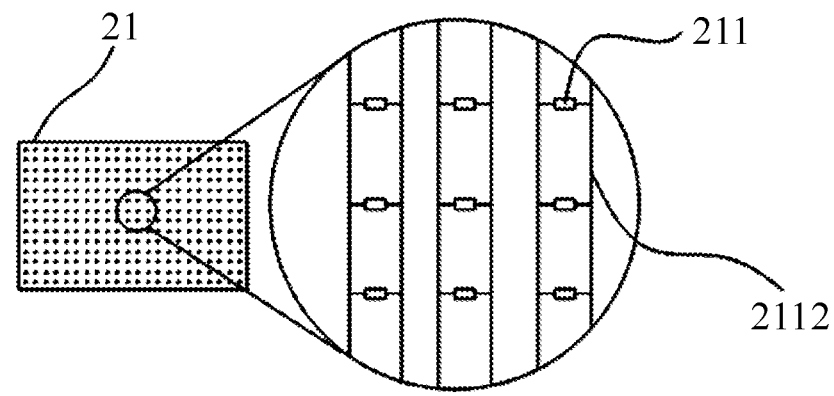
FIG. 6 is a schematic structural diagram of a plan view of a second light board according to an embodiment of the present disclosure.

FIG. 5 is a first schematic structural diagram of a side view of a second light board according to an embodiment of the present disclosure, and FIG. 6 is a schematic structural diagram of a plan view of a second light board according to an embodiment of the present disclosure.

As shown in FIG. 5, the second light board includes a second drive substrate 212, second light sources 211 and a protective layer 213.

The second light sources 211 are located on the second drive substrate 212, the second light sources 211 are electrically connected to the second drive substrate 212, and the second drive substrate 212 provides drive signals for the second light sources 211.

The second drive substrate 212 includes a second substrate 2121 and a second drive wire layer 2122 located on the second substrate. The second substrate 2121 may be made of transparent glass or transparent resin, and has transmittance. For example, a transparent glass plate in a range of 0.3 mm to 5.0 mm may be used as the second substrate 2121, and the transparency herein refers to glass that may transmit light.

During specific implementation, the second light board 22 may use a Mini LED light board or a Micro LED light board, that is, the second light source 211 uses a Mini LED or a Micro LED. The Mini LED and Micro LED refer to miniature LED chips, and the Mini LED generally has a greater size than the Micro LED. For example, the Mini LED generally has a size in a range of 100 µm to 200 µm, and the Micro LED generally has the size of 100 µm or below.

As shown in FIG. 6, because the second light source 211 has a small size, the second light source 211 may be connected through extremely small wires in the second drive wire layer 2122. The small wires may be made from materials including but not limited to metallic silver (Ag), gold (Au), copper (Cu), tin (Sn), or metal mixtures. These metals or metal mixtures form a conductive film with a uniform thickness in a range of about 0.3 µm to 1 µm on the transparent second substrate through a vacuum coating process, and then generate small wires with a width in a range of 3 µm to 15 µm through an etching process. Since the second light source 211 on the second light board 21 and the wires of the second drive wire layer 2122 have the size of microns, the second light board 21 which is generally transparent produces less blocking of the light and may easily transmit the light from the first light board.

As shown in FIG. 5, the second light board 21 further includes the protective layer 213 covering the second light sources 211 and the second drive substrate 212. The protective layer 213 plays a role in protecting and packaging the second light sources. According to actual requirements, the protective layer may further be designed from a shape, such that the protective layer may further adjust and optimize a light spot. The protective layer 213 may be made of transparent resin material, which is not limited herein. Optionally, the protective layer 213 may be separately arranged for each second light source 211, or all the second light sources 211 may be provided with the same protective layer or several second light sources 211 may be provided with one protective layer, etc., which are not limited herein.

In an embodiment of the present disclosure, the second light boards 21 in the second backlight module have transparency, and the backlight of the display panel 300 is provided by the first backlight module 100 and the second backlight module 200. Compared with a display device in the related art, the brightness of the display device provided in an embodiment of the present disclosure may be improved by 60% or higher.

In an embodiment of the present disclosure, the first light source 111 has a greater size than the second light source 211. Generally, light brightness of the first light source 111 is also higher than that of the second light source 211. The second light source 211 is set to have the small size, such that the arrangement of the light sources may be conveniently designed, and light emergence is prevented from being affected due to position overlapping of the light sources.

During specific implementation, the second backlight module 200 may include a plurality of the second light boards 21, and a second light source 211 at a side of a second light board 21 close to the display panel 300 has a smaller size than a second light source 211 at a side of a second light board 21 far away from the display panel 300. The second light sources 211 on the second light boards gradually decrease in size in a direction approaching the display panel 300, such that the second light source 211 close to the display panel 300 may be prevented from generating light shadows.

According to the above rules, the first light source 111 may use a LED, and the second light source 211 may use a Mini LED or a Micro LED. For example, if the second backlight module includes two second light boards 21, the first light source 111 on the first light board may use the LED, the second light source 211 on the second light board close to a side of the first light board may use the Mini LED, and the second light source 211 on the second light board close to a side of the display panel 300 may use the Micro LED.

In order to obtain higher contrast and achieve better high dynamic image display, the first light board 11 and the second light board 21 may each cooperate with the local dimming technology for image display. The first light board is divided into a plurality of first partitions, each first partition of the first partitions includes at least one first light source, and the first partitions are driven independently. Each second light board of the second light boards is divided into a plurality of second partitions, each second partition of the second partitions includes at least one second light source, and the second partitions are driven independently. The light boards may drive the partitions to be lit in different degrees according to brightness distribution of a displayed image, to improve the image contrast and achieve high dynamic image display.

According to an embodiment of the present disclosure, partitions shown in FIGS. 7A-7D are taken as examples to illustratively describe properties of the partitions of the first light board and the second light board according to embodiments of the present disclosure.

Figure 7A:
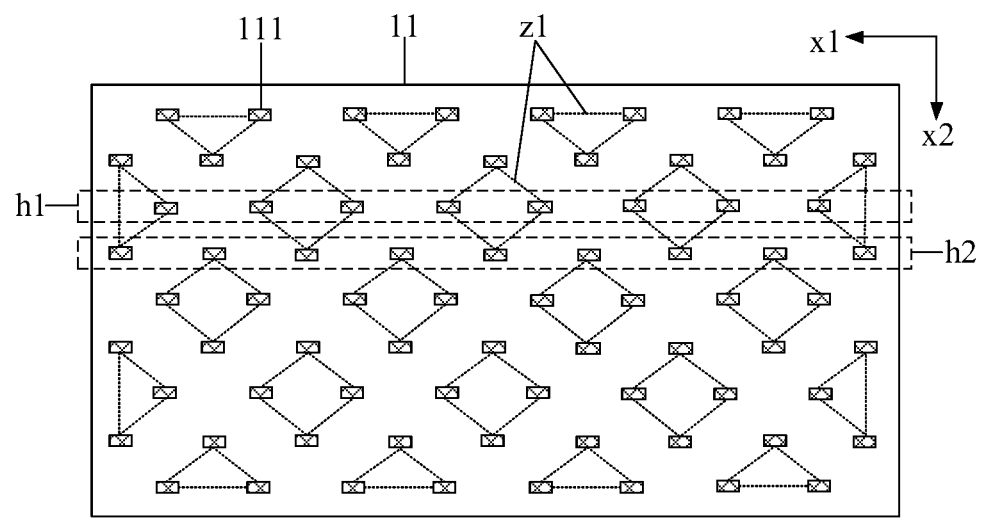
FIG. 7A is a schematic diagram of partitions of a first light board according to an embodiment of the present disclosure.
Figure 7B:
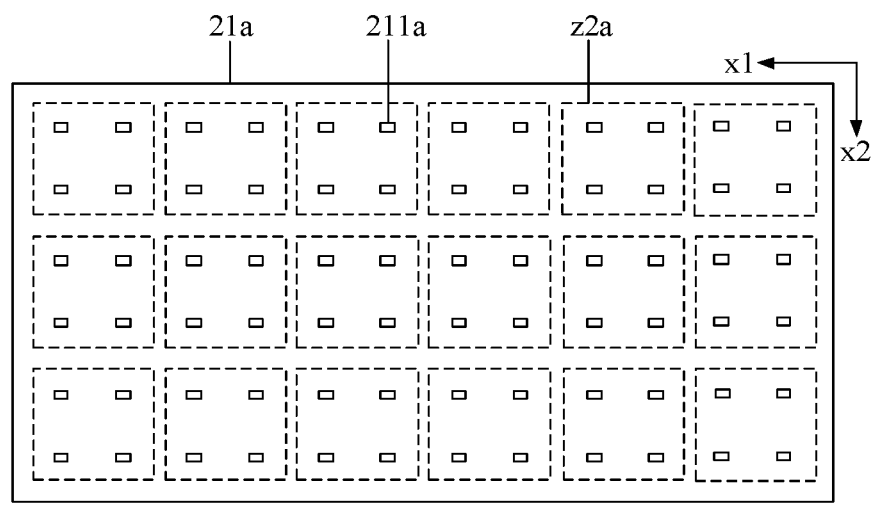
FIG. 7B is a schematic diagram of partitions of a second light board according to an embodiment of the present disclosure.
Figure 7C:
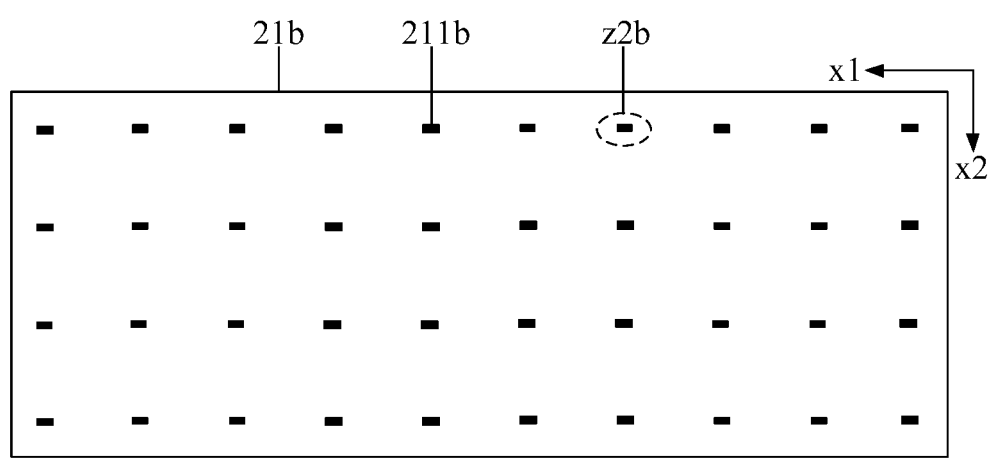
FIG. 7C is a schematic diagram of partitions of another second light board according to an embodiment of the present disclosure.
Figure 7D:
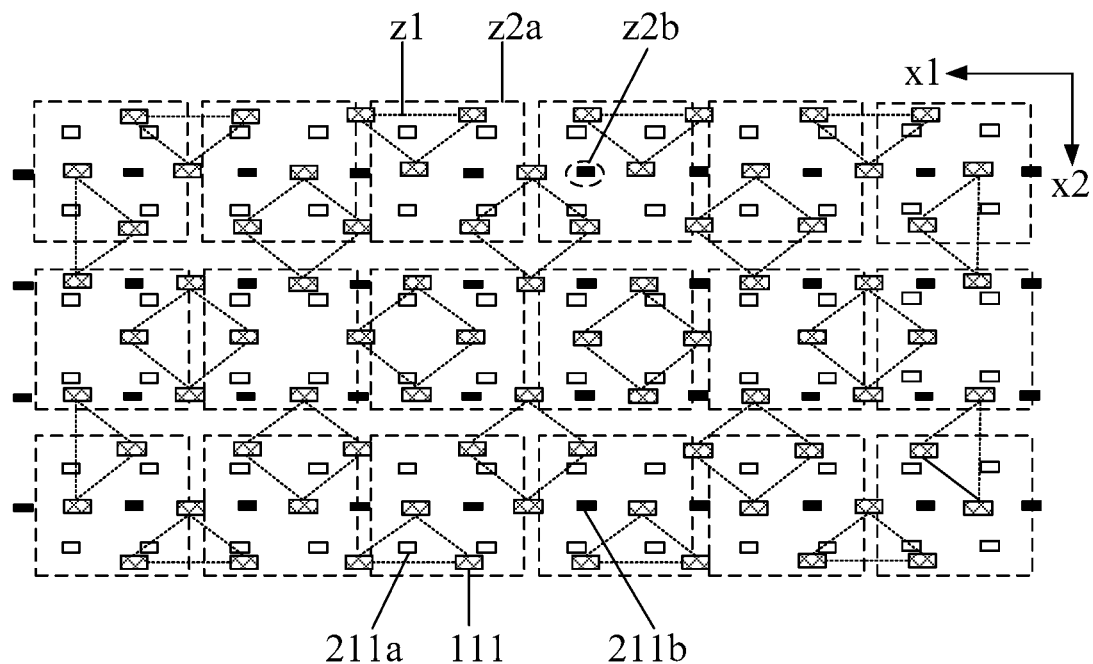
FIG. 7D is a schematic diagram showing stacking of partitions of a first light board and partitions of second light boards according to an embodiment of the present disclosure.

FIG. 7A is a schematic diagram of partitions of a first light board according to an embodiment of the present disclosure, FIG. 7B is a schematic diagram of partitions of a second light board according to an embodiment of the present disclosure, FIG. 7C is a schematic diagram of partitions of another second light board according to an embodiment of the present disclosure, and FIG. 7D is a schematic diagram showing stacking of partitions of a first light board and partitions of second light boards according to an embodiment of the present disclosure.

According to an embodiment of the present disclosure, a first backlight module including one first light board and a second backlight module including two second light boards are taken as an example for description. For the convenience of distinction, the two second light boards are named a first type of second light board and a second type of second light board respectively.

As shown in FIG. 7A, the first light board 11 is divided into a plurality of first partitions, each first partition of the first partitions z1 includes at least three first light sources 111, and the first partitions z1 are driven independently. As shown in FIG. 7A, a first partition z1 at a middle position includes four first light sources 111, and a first partition z1 at an edge position includes three first light sources 111.

Optionally, the first partitions z1 of the first light board 11 may each be designed to include three first light sources 111 or four first light sources 111, which are not limited herein.

As shown in FIG. 7B, the first type of second light board 21a is divided into a plurality of first type of second partitions z2a, each first type of second partition z2a includes four first type of second light sources 211a, and the first type of second partitions z2a are driven independently. Optionally, as shown in FIG. 7B, the first type of second partition z2a includes four first type of second light sources 211a. In an actual application, the first type of second partition z2a may be further provided with first type of second light sources 211a of a different quantity, which is not limited herein.

As shown in FIG. 7C, the second type of second light board 21b is divided into a plurality of second type of second partitions z2b, each second type of second partition z2b includes one second type of second light sources 211b, and the second type of second partitions z2b are driven independently. In an actual application, the second type of second partition z2a may be further provided with second type of second light sources 211b of a different quantity, which is not limited herein.

After the three light boards are stacked, distribution of light sources on the three light boards is shown in FIG. 7D when viewed from a side of the display panel 300. It may be seen from FIG. 7D that arrangement positions of the first light sources 111, the first type of second light sources 211a and the second type of second light sources 211b do not overlap one another. In addition, the first partition z1 of the first light board 11 and the first type of second partition z2a of the first type of second light board 21a have an overlapped area. According to an embodiment of the present disclosure, the first partition of the first light board and the second partition of at least one second light board overlap each other, and the first light source and the second light source do not overlap each other, such that more light sources may be arranged in the same area, and light brightness per unit area may be enhanced. This effect is achieved by stacking a plurality of light boards, so there is no pressure to arrange more light sources for each light board, and difficulty of circuit design for each light board may be reduced.

In some embodiments, as shown in FIG. 7A, the first light sources 111 in the first light board 11 are arranged into a plurality of first light source rows h1 and a plurality of second light source rows h2. The first light source rows h1 and the second light source rows h2 extend in a first direction x1 and are arranged in a second direction x2, and the first direction x1 and the second direction x2 intersect with each other. During specific implementation, the first direction x1 and the second direction x2 may be perpendicular to each other, for example, the first direction x1 may be a horizontal direction and the second direction x2 may be a vertical direction, which are not limited herein.

As shown in FIG. 7A, the first light source rows h1 and the second light source rows h2 are alternately arranged in the second direction x2, and the second light source rows h2 are staggered relative to the adjacent first light source rows h1 in the first direction x1. Staggered arrangement of the light sources may make the partitions constituted by the light sources irregular, thereby facilitating cooperating with light sources on other light boards and achieving more precise partition control.

The first light board shown in FIG. 7A is taken as an example, spaces between every two adjacent first light sources in the first light source row h1 are equal, spaces between every two adjacent first light sources in the second light source row h2 are equal, and the second light source row h2 is staggered by half of the above space relative to the adjacent first light source row h1 in the first direction x1. Therefore, when adjacent first light sources are put into one partition, a rhombic or triangular partition may be formed. As shown in FIG. 7A, in the edge region of the first light board 11, three first light sources 111 constitute one first partition z1, and in the middle region, four first light sources 111 constitute one first partition z1.

Each second light board in the second backlight module may use an arrangement rule as shown in FIG. 7B, such that the second light sources are arranged in an array in the first direction x1 and the second direction x2. The arrangement rule may be the same as an arrangement rule of light sources on a light board in the related art, and is not limited herein.

Figure 8A:
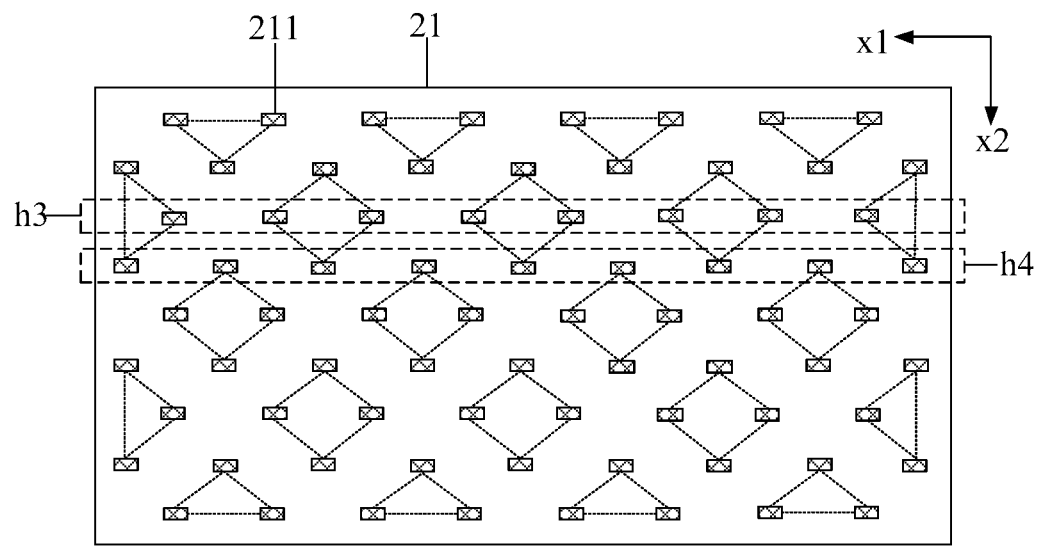
FIG. 8A is a schematic diagram of partitions of another type of second light board according to an embodiment of the present disclosure.
Figure 8B:
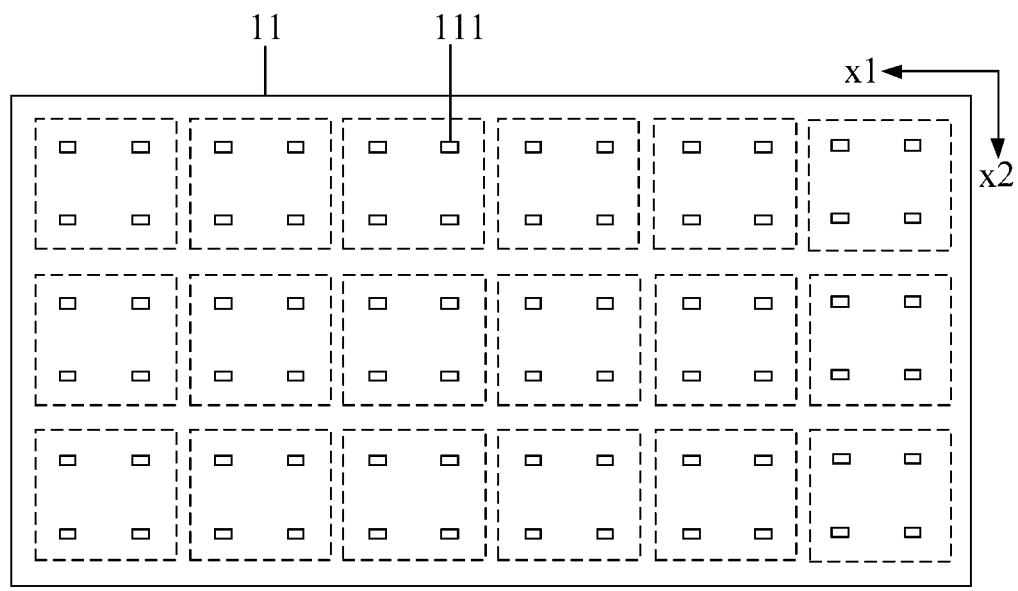
FIG. 8B is a schematic diagram of partitions of another type of first light board according to an embodiment of the present disclosure.

FIG. 8A is a schematic diagram of partitions of another type of second light board according to an embodiment of the present disclosure, and FIG. 8B is a schematic diagram of partitions of another type of first light board according to an embodiment of the present disclosure.

In some embodiments, second light sources on at least one second light board in a second backlight module are arranged according to a rule shown in FIG. 8A. As shown in FIG. 8A, second light sources 211 are arranged into a plurality of third light source rows h3 and a plurality of fourth light source rows h4, the third light source rows h3 and the fourth light source rows h4 extend in a first direction x1 and are arranged in a second direction x2, and the first direction x1 and the second direction x2 intersect with each other. The third light source rows h3 and the fourth light source rows h4 are alternately arranged in the second direction x2, and the fourth light source rows h4 are staggered relative to the adjacent third light source rows h3 in the first direction x1. The staggered second light board has the same function as the first light board shown in FIG. 7A, and is not repeated herein.

Second light sources in the remaining second light boards in the second backlight module are arranged in an array in the first direction and the second direction. First light sources 111 in the first light board 11 are arranged in an array in a first direction x1 and a second direction x2, as shown in FIG. 8B.

It should be noted that description in an embodiment of the present disclosure is merely made by taking the first light board and the plurality of second light boards as an example, among which light sources on at least one light board are staggered. During specific implementation, the arrangement rule of the light sources on the light board may be designed as required, and is not limited herein.

Figure 9:
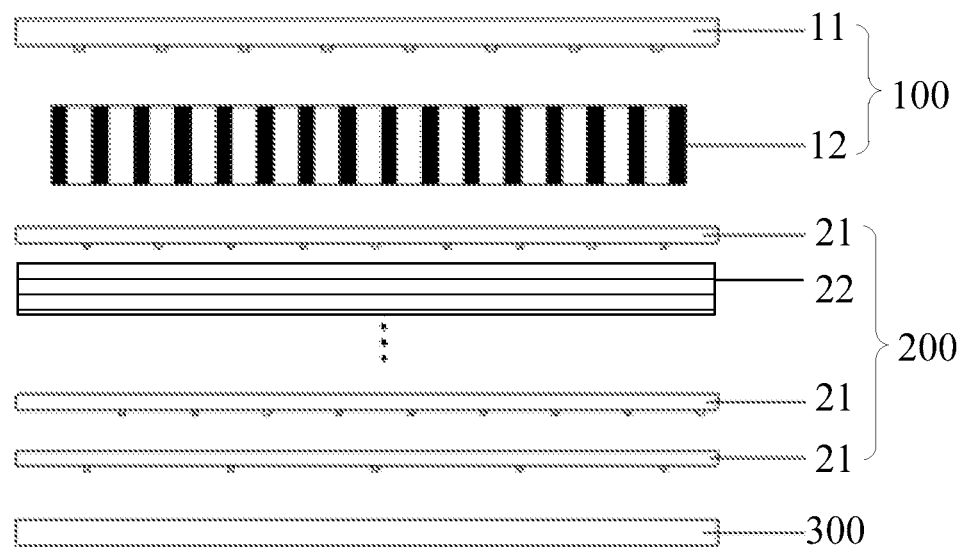
FIG. 9 is a second schematic structural diagram of a side view of a display device according to an embodiment of the present disclosure.

FIG. 9 is a second schematic structural diagram of a side view of a display device according to an embodiment of the present disclosure.

In some embodiments, as shown in FIG. 9, a first backlight module 100 further includes a light collimator 12, the light collimator 12 is located at a light emergent side of the first light board 11, and the light collimator 12 collimates the light emitted by the first light board 11.

In an embodiment of the present disclosure, the light collimator 12 is arranged on the light emergent side of the first light board 11, such that the first backlight module 100 finally emits collimated light. In a case that a display panel 300 merely uses the first backlight module 100 to provide backlight, the display panel has a smaller view angle range and is suitable for privacy display scenarios.

During specific implementation, the light collimator 12 may use a grating or a Fresnel lens film. Since a user mainly moves in a horizontal direction when watching a display device in an actual application, a grating may be arranged on the light emergent side of the first light board, a light transmission portion and a light shielding portion of the grating may extend in a vertical direction, and emergent light in the horizontal direction may be collimated by controlling a period and other parameters of the grating. In addition, two stacked gratings may be arranged on the light emergent side of the first light board, and extension directions of light transmission portions of the two gratings are perpendicular to each other, such that light may be collimated in two directions, and peeping may be prevented in the two directions.

As shown in FIG. 9, the second backlight module 200 further includes an optical film 22 located between any two adjacent second light boards 21. The optical film includes, but is not limited to, one or more of a light guide diffusion plate, a prismatic lens or a diffusion sheet. The light guide diffusion plate and the diffusion sheet may play the role of light diffusion, such that brightness of a light emergent surface is more uniform. The prismatic lens may converge light to a front view angle, to facilitate enhancement of the brightness of the front view angle. In FIG. 9, the optical film 22 is merely arranged between two second light boards 21 near the first backlight module 100. In an actual application, the optical film may be arranged between any two second light boards, and a type of the optical film may be adjusted according to actual requirements, which is not limited herein.

During specific implementation, the first light source 111 of the first light board 11 generally uses a LED, and the second light source 211 of the second light board 21 generally uses a Mini LED or a Micro LED. The LED, the Mini LED or the Micro LED are generally fabricated to have symmetrical structures. Therefore, according to a conventional fabrication solution of the related art, light emergent surfaces of the first light source 111 and the second light source 211 are parallel to a drive substrate, and a divergence angle of emergent light of the first light source 111 and a divergence angle of emergent light of the second light source 211 are symmetrical relative to a normal perpendicular to the light board. The light collimator is arranged on the light emergent side of the first light board 11, so the display device according to an embodiment of the present disclosure may be switched between a wide-view angle display mode and a privacy display mode by controlling light emergence by the first backlight module and the second backlight module.

Figure 10A:
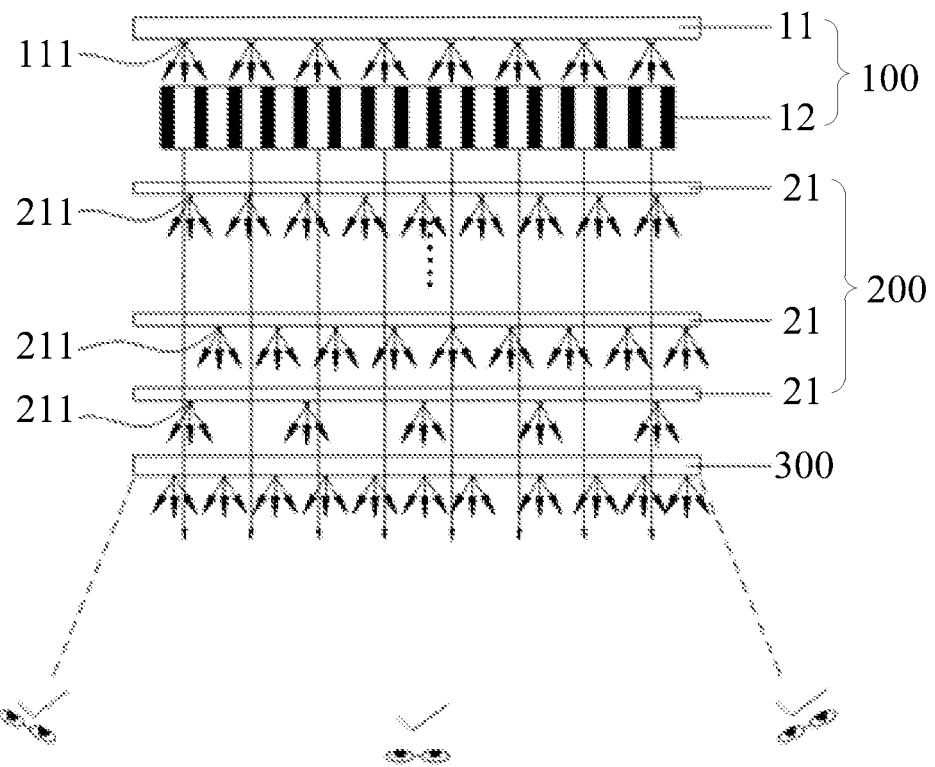
FIG. 10A is a schematic diagram of light emergence by a display device in a wide-view angle display mode according to an embodiment of the present disclosure.
Figure 10B:
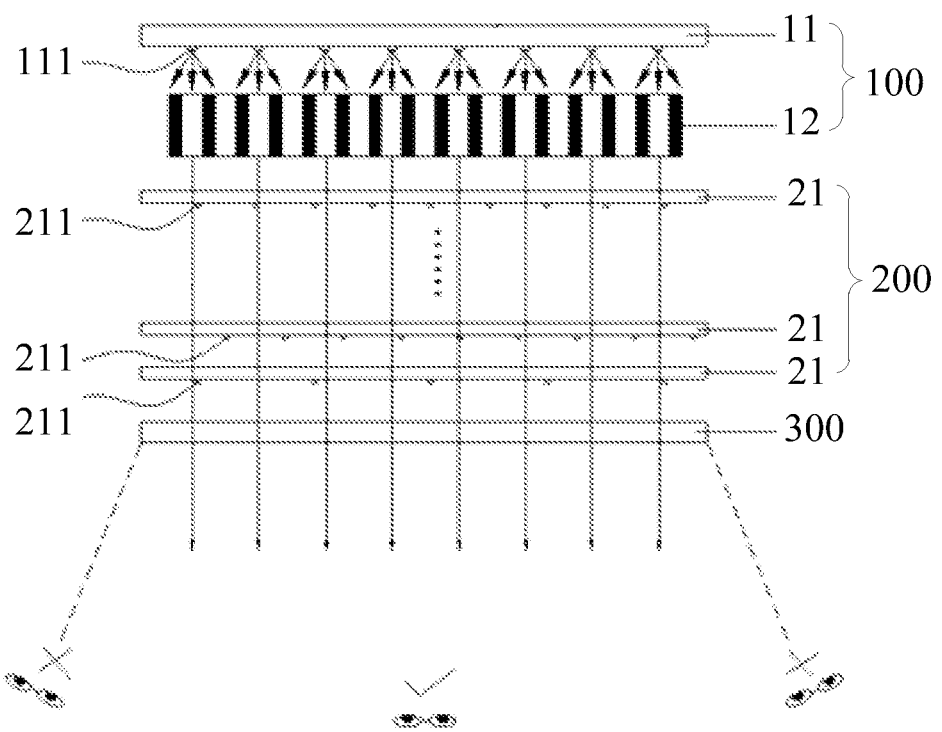
FIG. 10B is a schematic diagram of light emergence by a display device in a privacy display mode according to an embodiment of the present disclosure.

FIG. 10A is a schematic diagram of light emergence by a display device in a wide-view angle display mode according to an embodiment of the present disclosure, and FIG. 10B is a schematic diagram of light emergence by a display device in a privacy display mode according to an embodiment of the present disclosure.

As shown in FIGS. 10A and 10B, a divergence angle of emergent light of a first light source 111 of a first light board 11 in a first backlight module 100 is symmetrical relative to a normal perpendicular to the light board 11. A light collimator 12 is arranged at a light emergent side of the first light board 11 to make light finally emitted by the first backlight module 100 be collimated light.

A second backlight module 200 includes a plurality of second light boards 21, and a divergence angle of emergent light of a second light source 211 of each second light board 21 is symmetrical relative to a normal perpendicular to the second light board 21.

In a case of an application to the wide-view angle display mode, as shown in FIG. 10A, the first backlight module 100 and the second backlight module 200 are activated simultaneously, such that light finally incident to the display panel 300 has a certain divergence angle, and a displayed image may be viewed within this divergence angle range, thereby achieving wide-view angle display.

In an embodiment of the present disclosure, the first light sources of the first light board and the second light sources of the second light boards are each controlled according to partitions. In a case of the application to the wide-view angle display mode, the first backlight module and the second backlight module are activated simultaneously. Compared with a display device merely using one light board or light strip to provide backlight in the related art, the display device in an embodiment of the present disclosure has higher backlight brightness. In a case of displaying an image, brightness of partitions on the first light board and brightness of partitions on the second light boards may be controlled according to brightness distribution of the displayed image, to obtain higher image contrast and achieve better high dynamic image display.

In a case of an application to a privacy display mode, as shown in FIG. 10B, merely the first backlight module 100 is activated and the second backlight module 200 is deactivated, such that collimated emergent light of the first backlight module 100 passes through the second backlight module to be incident to the display panel 300. In this case, the displayed image may merely be viewed from a front view angle, and may not be viewed clearly from other positions or perspectives, thereby achieving privacy display.

In the related art, in order to achieve the privacy display, a privacy film or a privacy plate with a grating structure is generally arranged outside the display device. By setting a height and a space width of the grating, an angle of the emergent light of the display device may be changed and limited, and the user may see the picture within a limited angle range, while light beyond the limited angle range may be absorbed or blocked by the privacy film or the privacy plate, so this part of the light may not reach human eyes. According to the privacy solution, the privacy film or the privacy plate may be additionally arranged outside the display device, resulting in inconvenience during use by the user. The external privacy film or privacy plate is likely to be bruised or scratched by a hard object, resulting in poor pictures. Moreover, because the light beyond the view angle is absorbed or blocked among emergent light of the display device, picture brightness that may be received by the user may drop by 50% or higher, to make a picture dim and unclear, contrast dropped and user experience poor.

According to another solution in the related art, a light scattering device that may change light scattering characteristics is arranged between the backlight module and the display panel. By adjusting a voltage loaded on the light scattering device, an angle of light finally emitted by the display device may be changed, to adjust the picture view angle of the user. In a case that the light scattering device is in a transparent form, the user may merely see the picture directly facing the display device, thus achieving a narrow view angle. In a case that the light scattering device is in a semi-transparent and frosted form, finally scattered light passes through the display panel from different angles and is observed by the user, thus achieving a wide view angle. In the privacy solution, not all the emergent light of the backlight module may pass through the light scattering device, so the picture brightness may be greatly reduced. The light transmittance in the two display modes is different, so the picture brightness changes sharply in the case of switching of the view angle, the contrast drops, and the user experience is poor.

When the structure of the display device according to an embodiment of the present disclosure is used, since the first backlight module and the second backlight module include the plurality of light boards, an effect of little brightness change during switching of the view angle may be achieved by selecting a light board to be activated. For example, in privacy display mode, merely the first backlight module 100 is activated and the second backlight module 200 is deactivated; in the wide-view angle display mode, the first backlight module 100 is deactivated, and at least part of the second light boards 21 in the second backlight module are activated according to the brightness in the privacy display mode, such that the brightness in the wide-view angle display mode does not differs greatly from the brightness in the privacy display mode, and the problem of screen flicker caused by drastic brightness change under switching of the view angle is avoided.

Figure 11:
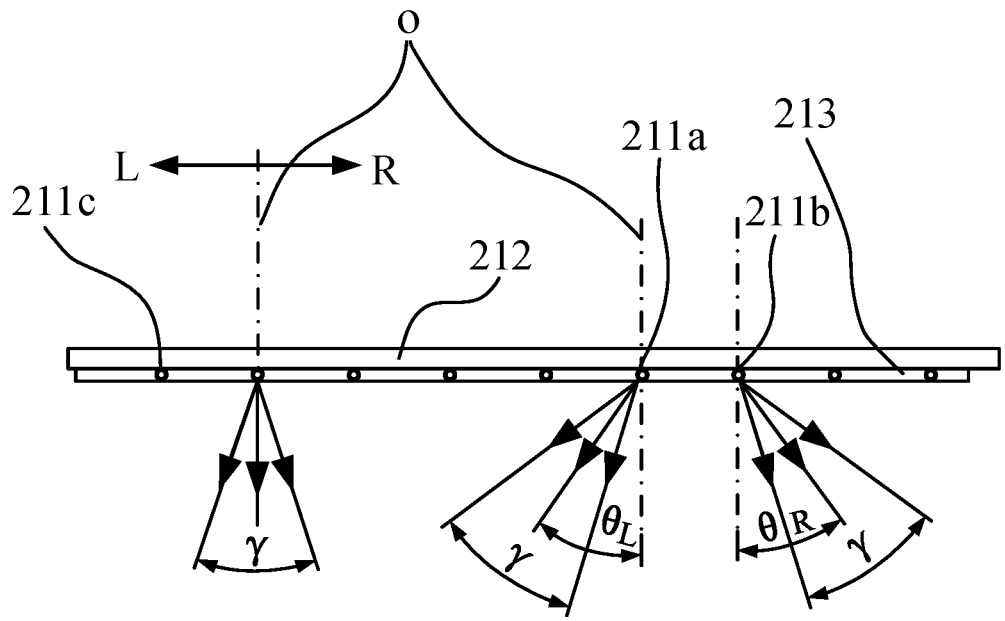
FIG. 11 is a second schematic structural diagram of a side view of a second light board according to an embodiment of the present disclosure.
Figure 12:
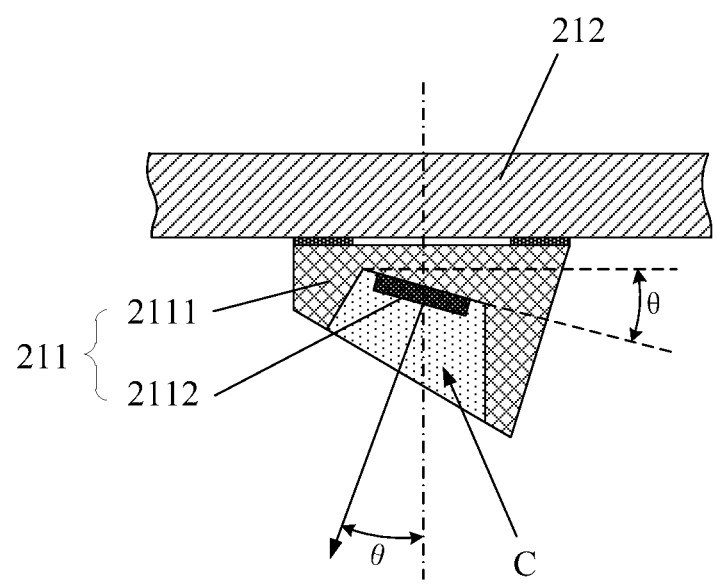
FIG. 12 is a schematic structural diagram of a first type (second type) of second light source according to an embodiment of the present disclosure.

FIG. 11 is a second schematic structural diagram of a side view of a second light board according to an embodiment of the present disclosure, and FIG. 12 is a schematic structural diagram of a first type of (second type of) second light source according to an embodiment of the present disclosure.

In some embodiments, as shown in FIG. 11, second light sources in at least one second light board in a second backlight module are at least divided into a first type of second light source 211a and a second type of second light source 211b, and a divergence angle of emergent light of the first type of second light source 211a and a divergence angle of emergent light of the second type of second light source 211b are symmetrical relative to a normal o perpendicular to the second light board.

As shown in FIG. 12, the first type of second light source and the second type of second light source each include a support 2111 and a light-emitting chip 2112. The support 2111 is electrically connected to a second drive substrate 212, the support 2111 is recessed towards a side of the second drive substrate 212 to form an accommodation space C, the light-emitting chip 2112 is fixed in the accommodation space C of the support, and the accommodation space C is filled with protective glue.

As for the first type of second light source and the second type of second light source, as shown in FIG. 12, a surface of the support for fixing the light-emitting chip is not parallel to the second drive substrate, that is, the surface of the support for fixing the light-emitting chip forms a certain angle θ with the second drive substrate. The light-emitting chip 2112 is fixed on an inclined surface, such that a light emergent surface of the light-emitting chip 2112 inclines relative to the second drive substrate 212 by a certain angle θ, and a divergence angle of emergent light of the first type of second light source 211a and a divergence angle of emergent light of the second type of second light source 211b incline relative to a normal o perpendicular to the second light board.

In an embodiment of the present disclosure, as shown in FIG. 11, a surface in the first type of second light source 211a for fixing the light-emitting chip inclines towards a first side R, a surface in the second type of second light source 211b for fixing the light-emitting chip inclines towards a second side L, and the first side R and the second side L are two opposite sides of the normal o perpendicular to the second light board. A structure shown in FIG. 11 is taken as an example, the first side R may be a right side of the normal o, and the second side L may be a left side of the normal o. Then, after the surface in the first type of second light source 211a for fixing the light-emitting chip inclines rightwards by $θ_L$, the divergence angle of the emergent light of the first type of second light source 211a may incline leftwards by $θ_L$. After the surface in the second type of second light source 211b for fixing the light-emitting chip inclines leftwards by $θ_R$, the divergence angle of the emergent light of the second light source 211b inclines rightwards by $θ_R$, such that the emergent light of the second light source in the second light board is directional. Therefore, when the second light board of this kind is used to provide backlight for the display panel, privacy may be achieved at different view angles.

In some embodiments, as shown in FIG. 11, the second light source of the second light board further includes a third type of second light source 211c, a light emergent surface of the third type of second light source 211c is parallel to the second drive substrate 212, such that a divergence angle of the emergent light of the third type of second light source 211c is symmetrical relative to the normal o perpendicular to the second light board. Therefore, in a case that the first type of second light source 211a, the third type of second light source 211c and the second type of second light source 211b are arranged successively, a wider view angle may be constituted, and privacy may be achieved in different view angles by controlling different types of second light sources of the second light board to be turned on or turned off.

During specific implementation, a first type of second light source 211a, a second type of second light source 211b and a third type of second light source 211c may form a second light source group, and in a same second light source group, the third type of second light source 211c is located between the first type of second light source 211a and the second type of second light source 211b. A plurality of second light source groups are arranged in an array, such that multi-angle and uniform backlight may be improved, and a second light source corresponding to an inclined direction may be lit at a required view angle, such that peep prevention at another angle may be achieved.

Figure 13:
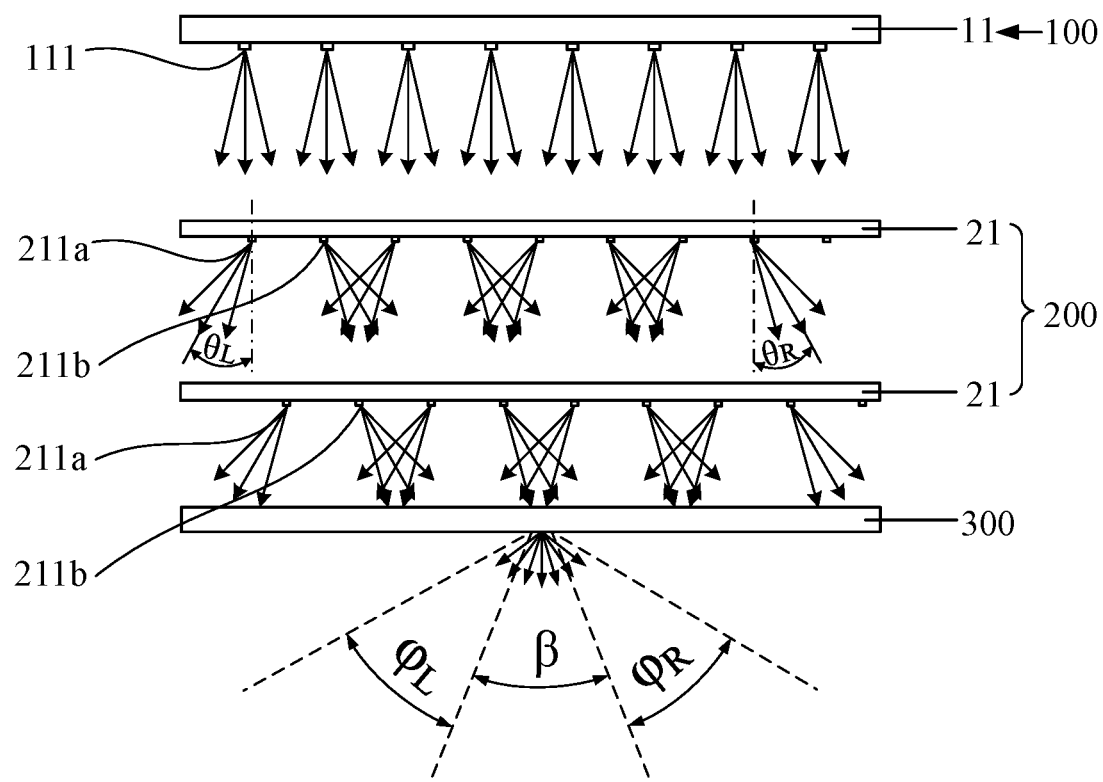
FIG. 13 is a third schematic structural diagram of a side view of a display device according to an embodiment of the present disclosure.

FIG. 13 is a third schematic structural diagram of a side view of a display device according to an embodiment of the present disclosure.

A structure of the display device shown in FIG. 13 will be taken as an example for detailed description. As shown in FIG. 13, a first backlight module 100 includes a first light board 11, and a divergence angle of emergent light of a first light source 111 of the first light board 11 is symmetrical relative to a normal.

A second backlight module 200 includes two second light boards 21, and each second light board 21 includes first type of second light sources 211a and second type of second light sources 211b, and the first type of second light sources 211a and the second type of second light sources 211b are alternately arranged.

A light emergence direction of the first type of second light source 211a inclines leftwards by an angle $θ_L$ from a normal perpendicular to the second light board, and a light emergence direction of the second type of second light source 211b inclines rightwards by an angle $θ_R$ from the normal perpendicular to the second light board. The angle $θ_L$ and the angle $θ_R$ may be the same or different. By controlling light emergence by different types of second light sources of the first light board and the second light board, privacy control in different view angles is achieved.

For example, in a case that the first light source 111 of the first light board 11 is turned off, the first type of second light source 211a of the second light board 21 is turned on, and the second type of second light source 211b of the second light board 21 is turned off, light inclining leftwards by the angle $θ_L$ is incident to the display panel 300, so an observer may merely see a picture within a view angle range $φ_L$ of the display device, and in this case, the display device is in a display mode of privacy at middle and right view angles.

In a case that the first light source 111 of the first light board 11 is turned off, the first type of second light source 211a of the second light board 21 is turned off, and the second type of second light source 211b of the second light board 21 is turned on, light inclining rightwards by the angle $θ_R$ is incident to the display panel 300, so an observer may merely see a picture within a view angle range $φ_R$ of the display device, and in this case, the display device is in a display mode of privacy at middle and left view angles.

In a case that the first light source 111 of the first light board 11, the first type of second light source 211a of the second light board 21, and the second type of second light source 211b of the second light board 21 are turned on simultaneously, a displayed picture may be seen within a view angle range $\varphi_L+\beta+\varphi_R$, and in this case, the display device is in a wide-view angle display mode.

According to the above rule, the first light source 111, the first type of second light source 211a and the second type of second light source 211b may be controlled to switch the view angles as shown in the following table, and reference may be made to the above example for a control principle, which is not repeated herein.

| Light source state | View angle | Display mode |
| --- | --- | --- |
| Turn on 111 + 211a + 211b | $\varphi_L + \beta + \varphi_R$ | Wide-view angle display mode |
| Turn on 111 + 211a and turn off 211b | $\varphi_L + \beta$ | Right side privacy display mode |
| Turn on 111 + 211b and turn off 211a | $\beta + \varphi_R$ | Left side privacy display mode |
| Turn on 111 and turn off 211a + 211b | $\beta$ | Left-right side privacy display mode |
| Turn off 111 and turn on 211a + 211b | $\varphi_L + \varphi_R$ | Middle privacy display mode |
| Turn off 111 + 211a and turn on 211b | $\varphi_R$ | Middle and left side privacy display mode |
| Turn off 111 + 211b and turn on 211a | $\varphi_L$ | Middle and right side privacy display mode |

Figure 14:
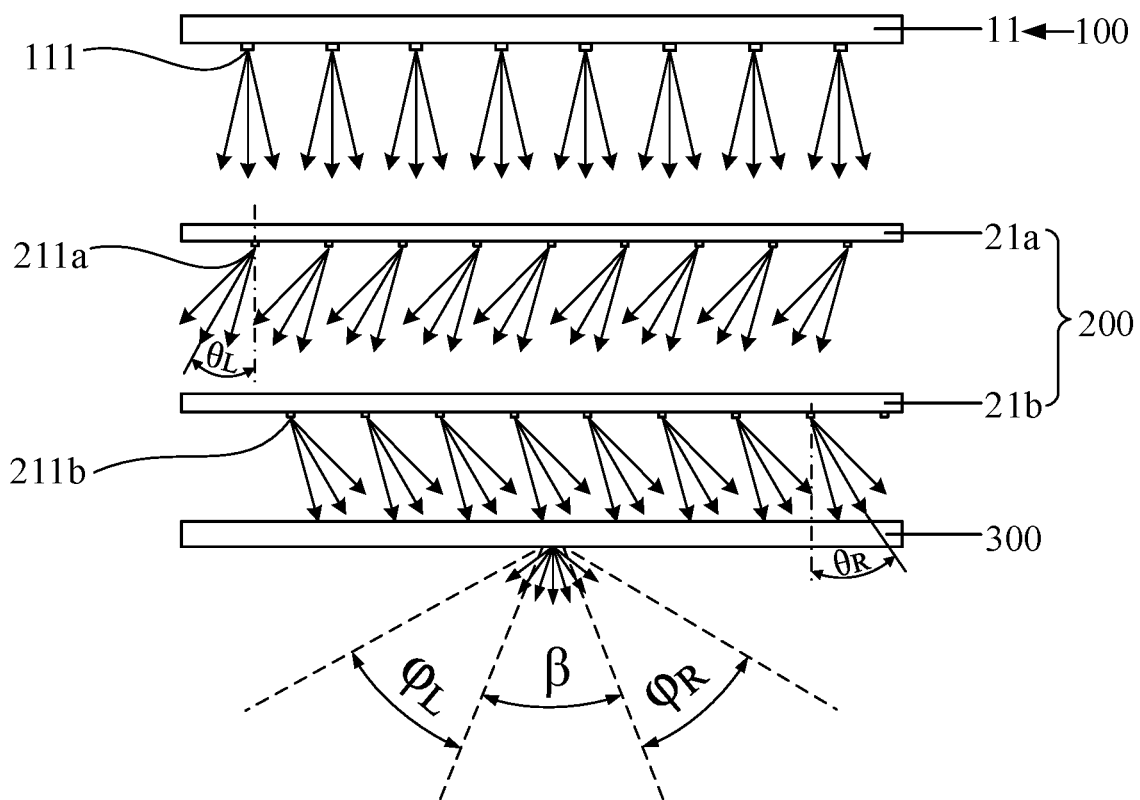
FIG. 14 is a fourth schematic structural diagram of a side view of a display device according to an embodiment of the present disclosure.

FIG. 14 is a fourth schematic structural diagram of a side view of a display device according to an embodiment of the present disclosure.

In some embodiments, as shown in FIG. 14, a second backlight module 200 at least includes two types of second light boards, that is, a first type of second light board 21a and a second type of second light board 21b.

Each of second light sources of the first type of second light board 21a is a first type of second light source 211a, and each of second light sources of the second type of second light board 21b is a second type of second light source 211b.

A divergence angle of emergent light of the first type of second light source 211a and a divergence angle of emergent light of the second type of second light source 211b incline to two sides of a normal respectively. By controlling different second light boards to emit light, switching between different view angles may be achieved.

The first type of second light source and the second type of second light source in an embodiment of the present disclosure are the same as those in FIG. 11. Reference may be made to the above embodiments for structures and properties of the first type of second light source 211a and the second type of second light source 211b, which will not be repeated herein.

In some embodiments, the second backlight module further includes a third type of second light board, and each of second light sources of the third type of second light board is a third type of second light source.

A light emergent surface of the third type of second light source is parallel to a second drive substrate, such that a divergence angle of emergent light of the third type of second light source is symmetrical relative to the normal perpendicular to the second light board.

Therefore, in a case that the first type of second light source 211a, the third type of second light source and the second type of second light source 211b are arranged successively, a wider view angle may be constituted, and privacy may be achieved in different view angles by controlling different second light boards to be turned on or turned off.

The third type of second light source in an embodiment of the present disclosure is the same as that in FIG. 11. Reference may be made to the above embodiment for a structure and properties of the third type of second light source, which will not be repeated herein.

A structure of the display shown in FIG. 14 will be taken as an example for detailed description. As shown in FIG. 14, a first backlight module 100 includes a first light board 11, and a divergence angle of emergent light of a first light source 111 of the first light board 11 is symmetrical relative to a normal.

A second backlight module 200 includes two types of second light boards 21, that is a first type of second light board 21a and a second type of second light board 21b. The first type of second light board 21a includes first type of second light sources 211a, and the second type of second light board 21b include second type of second light sources 211b.

A light emergence direction of the first type of second light source 211a inclines leftwards by an angle $\theta_L$ from a normal perpendicular to the second light board, and a light emergence direction of the second type of second light source 211b inclines rightwards by an angle $\theta_R$ from the normal perpendicular to the second light board. The angle $\theta_L$ and the angle $\theta_R$ may be the same or different. By controlling light emergence by the first light board and the second light boards, privacy control in different view angles is achieved.

For example, in a case that the first light board 11 is turned off, the first type of second light board 21a is turned on, and the second type of second light board 21b is turned off, light inclining to the left by the angle $\theta_L$ is incident to the display panel 300, so an observer may merely see a picture within a view angle range $\varphi_L$ of the display device, and in this case, the display device is in a display mode of privacy in middle and right view angles.

In a case that the first light board 11 is turned off, the first type of second light board 21a is turned off, and the second type of second light board 21b is turned on, light inclining to the right by the angle $\theta_R$ is incident to the display panel 300, so an observer may merely see a picture within a view angle range $\varphi_R$ of the display device, and in this case, the display device is in a display mode of privacy in middle and left view angles.

In a case that the first light board 11, the first type of second light board 21a, and the second type of second light board 21b are turned on simultaneously, a displayed picture may be seen within a view angle range $\varphi_L+\beta+\varphi_R$, and in this case, the display device is in a wide-view angle display mode.

According to the above rule, the first light board 11, the first type of second light board 21a and the second type of second light board 21b may be controlled to switch the view angles as shown in the following table, and reference may be made to the above example for a control principle, which is not repeated herein.

| Light board state | View angle | Display mode |
| --- | --- | --- |
| Turn on 11 + 21a + 21b | $\varphi_L + \beta + \varphi_R$ | Wide-view angle display mode |
| Turn on 11 + 21a and turn off 21b | $\varphi_L + \beta$ | Right side privacy display mode |
| Turn on 11 + 21b and turn off 21a | $\beta + \varphi_R$ | Left side privacy display mode |
| Turn on 11 and turn off 21a + 21b | $\beta$ | Left-right side privacy display mode |
| Turn off 11 and turn | $\varphi_L + \varphi_R$ | Middle privacy |

-continued

| Light board state | View angle | Display mode |
|---|---|---|
| on 21a + 21b | | display mode |
| Turn off 11 + 21a and turn on 21b | $\varphi_R$ | Middle and left side privacy display mode |
| Turn off 11 + 21b and turn on 21a | $\varphi_L$ | Middle and right side privacy display mode |

Figure 15:
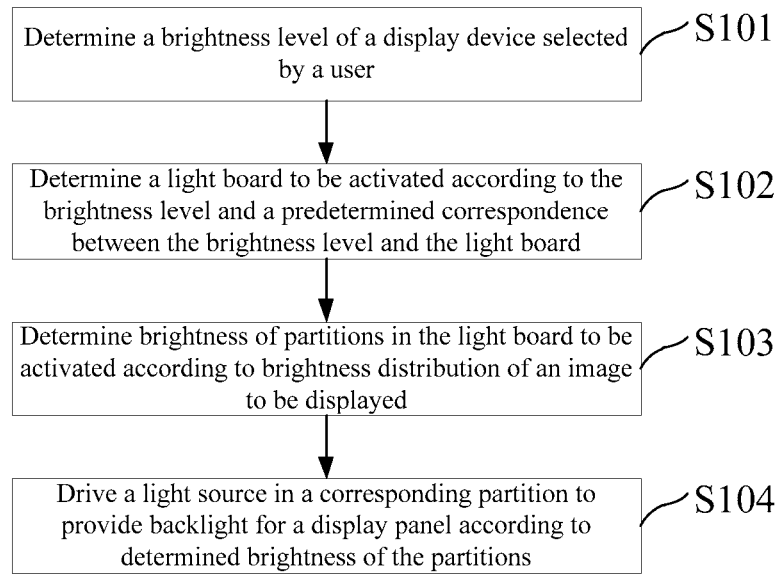
FIG. 15 is first flowchart of a control method for a display device according to an embodiment of the present disclosure.

According to another aspect of an embodiment of the present disclosure, a control method for any display device above is provided. FIG. 15 is first flowchart of a control method for a display device according to an embodiment of the present disclosure.

As shown in FIG. 15, the control method for a display device includes following steps.

S101, a brightness level of the display device selected by a user is determined.

S102, a light board to be activated is determined according to the brightness level and a predetermined correspondence between the brightness level and the light board.

S103, brightness of partitions in the light board to be activated is determined according to brightness distribution of an image to be displayed.

S104, a light source in a corresponding partition is driven to provide backlight for a display panel according to determined brightness of the partitions.

The display device according to an embodiment of the present disclosure includes a first backlight module and a second backlight module, and the first backlight module and the second backlight module may provide backlight for the display panel. The first backlight module includes a first light board, and the second backlight module includes at least one second light board. Overall brightness may be changed by turning on light boards of different quantities. First light sources of the first light board may be divided into a plurality of first partitions, and the first light sources in the first partitions may be independently controlled. Second light sources of each second light board may be divided into a plurality of second partitions, and the second light sources in the second partitions may be independently controlled. Therefore, the first light board and the second light board may each achieve local dimming.

During specific implementation, the correspondence between the brightness level and the light board may be pre-stored in the display device, and the correspondence between the brightness level and the light board may be set according to actual requirements. When information on the brightness level is obtained, the light board to be activated may be determined according to the correspondence. The above brightness level may be selected by a user through a remote control device or keys. Therefore, after the brightness level of the display device selected by the user is received, according to the pre-stored correspondence between the brightness level and the light board, the light board to be activated is determined. In addition, by cooperating with local dimming technology, brightness of the partitions in an activated light board is determined according to brightness distribution of an image to be displayed, to drive a light source in a corresponding partition to provide backlight for the display panel according to determined brightness, thereby obtaining higher image contrast, and facilitating better high dynamic range image display. Compared with a display device in the related art, the display device according to an embodiment of the present disclosure has higher display brightness, and the brightness level may be selected as required.

In some embodiments, the display device may use the structure as shown in FIGS. 10A and 10B. That is, a light collimator is arranged in the first backlight module, such that the first backlight module finally emits collimated light. However, the second light boards in the second backlight module are not collimated, such that light finally emitted by the second backlight module has a certain divergence angle. When the structure of the display device as shown in FIGS. 10A and 10B is used, a wide view angle and a narrow view angle may be switched, and the device may be applied to the privacy display scenario.

Figure 16:
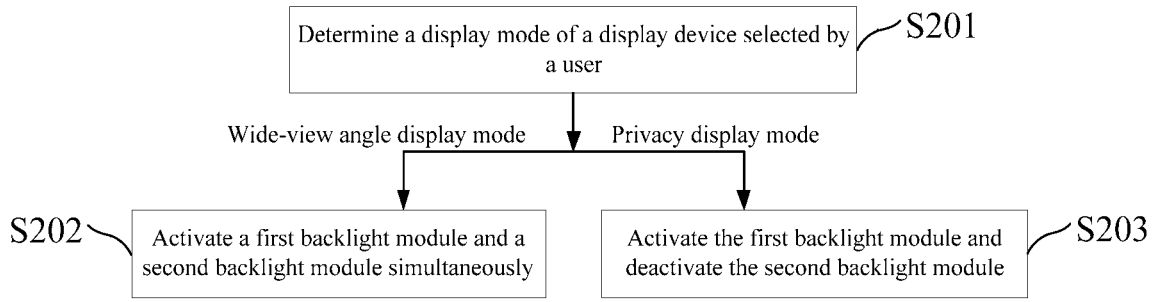
FIG. 16 is a second flowchart of a control method for a display device according to an embodiment of the present disclosure.

FIG. 16 is a second flowchart of a control method for a display device according to an embodiment of the present disclosure.

As shown in FIG. 16, the control method for a display device further includes following steps.

S201, a display mode of the display device selected by the user is determined, step S202 is executed in a case that a determined display mode is a wide-view angle display mode, and step S203 is executed in a case that a determined display mode is a privacy display mode, the display mode includes the wide-view angle display mode and the privacy display mode.

S202, a first backlight module and a second backlight module are activated simultaneously.

S203, the first backlight module is activated and the second backlight module is deactivated.

Since emergent light of the first backlight module is collimated light, if merely the first backlight module is used to provide backlight, the display panel may obtain high brightness merely in a front view angle, while brightness may be greatly reduced in a side view angle, thus achieving an effect of privacy in the side view angle. Emergent light of the second backlight module has a certain divergence angle, so if the second backlight module is used to provide backlight, the image of the display may be watched through the display panel within this divergence angle, and the display device may be used in the wide-view angle display mode.

Since the display device according to an embodiment of the present disclosure has the above properties, switch between the wide-view angle display mode and privacy display mode may be achieved by controlling the backlight modules. Then, during specific implementation, the user may select a required display mode through a remote control device or keys, and when the user selects the wide-view angle display mode, the first backlight module and the second backlight module may be activated simultaneously to provide backlight for the display panel, to obtain greater brightness. When the user selects privacy display mode, merely the first backlight module may be activated to provide backlight for the display panel, thus achieving privacy display.

It should be noted that the display device in the related art will have a great brightness difference when switched between a wide-view angle display mode and a privacy display mode, thereby affecting a display effect. Since the display device according to an embodiment of the present disclosure includes two backlight modules, the first backlight module may be deactivated in the wide-view angle display mode according to the brightness of the display in the privacy display mode during view angle switching, and part of the second light boards in the second backlight module may be activated, such that a brightness difference between the two display modes is tolerable, and the problem of screen flicker is avoided.

In some embodiments, as shown in FIGS. 13 and 14, there may be various angles of the emergent light of the second light sources in the display device, such that the display device of an embodiment of the present disclosure may further achieve a function of switching various view angles.

Figure 17:
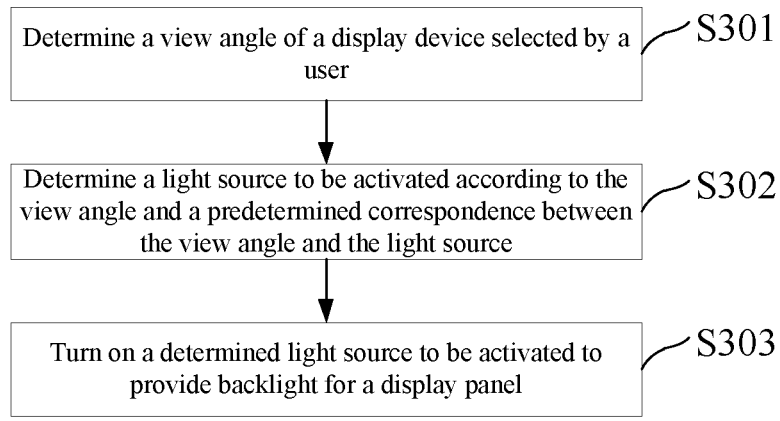
FIG. 17 is a third flowchart of a control method for a display device according to an embodiment of the present disclosure.

FIG. 17 is a third flowchart of a control method for a display device according to an embodiment of the present disclosure.

As shown in FIG. 17, the control method for a display device further includes following steps.

S301, a view angle of the display device selected by a user is determined.

S302, a light source to be activated is determined according to the view angle and a predetermined correspondence between the view angle and the light source.

S303, a determined light source to be activated is turned on to provide backlight for a display panel.

A display device according to an embodiment of the present disclosure may use the structure as shown in FIG. 13, that is, at least one second light board in a second backlight module includes a first type of second light source and a second type of second light source, and a divergence angle of emergent light of the first type of second light source and a divergence angle of emergent light of the second type of second light source are not symmetrical, but incline to two sides relative to a normal respectively. A divergence angle of emergent light of a first light source of a first light board in a first backlight module is symmetrical relative to the normal. In this way, by controlling the first light source, the first type of second light source and the second type of second light source, switching between different view angles may be achieved.

The display device according to an embodiment of the present disclosure may further use the structure as shown in FIG. 14, that is, at least a first type of second light board and a second type of second light board are arranged in a second backlight module. Light sources of the first type of second light board all use first type of second light sources, and light sources of the second type of second light board all use second type of second light sources, so switching between different view angles may also be achieved by controlling the first light board, the first type of second light board and the second type of second light board.

During specific implementation, it is necessary to pre-store a correspondence between a view angle and the light source in the display device, and the correspondence between the view angle and the light source may vary for different structures used by the display device. When the structure of the display device shown in FIG. 13 is used, the correspondence between the view angle and the light source may be seen in the following table.

| Light source state | View angle | Display mode |
|---|---|---|
| Turn on 111 + 211a + 211b | $\varphi_L + \beta + \varphi_R$ | Wide-view angle display mode |
| Turn on 111 + 211a and turn off 211b | $\varphi_L + \beta$ | Right side privacy display mode |
| Turn on 111 + 211b and turn off 211a | $\beta + \varphi_R$ | Left side privacy display mode |
| Turn on 111 and turn off 211a + 211b | $\beta$ | Left-right side privacy display mode |
| Turn off 111 and turn on 211a + 211b | $\varphi_L + \varphi_R$ | Middle privacy display mode |
| Turn off 111 + 211a and turn on 211b | $\varphi_R$ | Middle and left side privacy display mode |
| Turn off 111 + 211b and turn on 211a | $\varphi_L$ | Middle and right side privacy display mode |

When the structure of the display shown in FIG. 14 is used, the correspondence between the view angle and the light source may be seen in the following table.

| Light board state | View angle | Display mode |
|---|---|---|
| Turn on 11 + 21a + 21b | $\varphi_L + \beta + \varphi_R$ | Wide-view angle display mode |
| Turn on 11 + 21a and turn off 21b | $\varphi_L + \beta$ | Right side privacy display mode |
| Turn on 11 + 21b and turn off 21a | $\beta + \varphi_R$ | Left side privacy display mode |
| Turn on 11 and turn off 21a + 21b | $\beta$ | Left-right side privacy display mode |
| Turn off 11 and turn on 21a + 21b | $\varphi_L + \varphi_R$ | Middle privacy display mode |
| Turn off 11 + 21a and turn on 21b | $\varphi_R$ | Middle and left side privacy display mode |
| Turn off 11 + 21b and turn on 21a | $\varphi_L$ | Middle and right side privacy display mode |

During specific implementation, the user may select a required view angle through a remote control device or keys, after the view angle selected by the user is received, the light source to be activated may be determined by searching the two tables above, such that a corresponding light source may be turned on to provide backlight for the display panel, that is, the image may be displayed in a selected view angle, thereby achieving the effect of privacy at other view angles.

While embodiments of the present disclosure have been described, additional alterations and modifications to those embodiments can still be made by those skilled in the art once the basic inventive concept is learned. Therefore, the appended claims will be interpreted to include embodiments and all alterations and modifications that fall within the scope of the present disclosure.

Apparently, a person of ordinary skill in the art can make various modifications and variations to embodiments of the present disclosure without departing from the spirit and scope of embodiments of the present disclosure. In this way, if these modifications and variations of embodiments of the present disclosure fall within the scope of the claims of the present disclosure and their equivalent technologies, the present disclosure is also intended to include these modifications and variations.

What is claimed is:

1. A display device, comprising:
  a first backlight module;
  a second backlight module, located at a light emergent side of the first backlight module; and
  a display panel, located at a side of the second backlight module facing away from the first backlight module;
  wherein:
  the first backlight module comprises a first light board, and the first light board emits light to a side of the second backlight module;
  the second backlight module comprises at least one second light board, second light boards of the at least one second light board are stacked, and the second light boards transmit the light emitted by the first backlight module and emit light to the display panel; and
  the first light board comprises a plurality of first light sources, each second light board of the second light boards comprises a plurality of second light sources, and orthographic projections of the first light sources and the second light sources on the display panel do not overlap each other;

wherein the second backlight module comprises a plurality of the second light boards, and a second light source at a side of a second light board close to the display panel has a smaller size than a second light source at a side of a second light board far away from the display panel.

2. The display device according to claim 1, wherein the first light board is divided into a plurality of first partitions, each first partition of the first partitions comprises at least one first light source, and the first partitions are driven independently; and
each second light board of the second light boards is divided into a plurality of second partitions, each second partition of the second partitions comprises at least one second light source, and the second partitions are driven independently.

3. The display device according to claim 2, wherein orthographic projections of the first partition of the first light board and the second partition of the at least one second light board on the display panel have an overlapped area.

4. The display device according to claim 2, wherein the first light sources in the first light board are arranged into a plurality of first light source rows and a plurality of second light source rows, the first light source rows and the second light source rows extend in a first direction and are arranged in a second direction, and the first direction and the second direction intersect with each other;
the first light source rows and the second light source rows are alternately arranged in the second direction, and the second light source rows are staggered relative to the first light source rows adjacent thereto in the first direction; and
the second light sources in each second light board of the second light boards are arranged in an array in the first direction and the second direction.

5. The display device according to claim 2, wherein the second light sources in the at least one second light board in the second backlight module are arranged into a plurality of third light source rows and a plurality of fourth light source rows, the third light source rows and the fourth light source rows extend in a first direction and are arranged in a second direction, and the first direction and the second direction intersect with each other;
the third light source rows and the fourth light source rows are alternately arranged in the second direction, and the fourth light source rows are staggered relative to the third light source rows adjacent thereto in the first direction;
the second light sources in a remaining second light board in the second backlight module are arranged in an array in the first direction and the second direction; and
the first light sources in the first light board are arranged in an array in the first direction and the second direction.

6. The display device according to claim 1, wherein the first backlight module further comprises:
a light collimator, located at a light emergent side of the first light board, the light collimator collimating the light emitted by the first light board.

7. The display device according to claim 6, wherein the light collimator is a grating or a Fresnel lens film.

8. The display device according to claim 1, wherein the second backlight module further comprises:
an optical film, located between any two second light boards adjacent to each other, and
the optical film comprises one or more of a light guide diffusion plate, a prismatic lens or a diffusion sheet.

9. The display device according to claim 6, wherein the second light board further comprises:
a second drive substrate, the second light sources being located on the second drive substrate and being electrically connected to the second drive substrate; and
a protective layer, covering the second light sources and the second drive substrate; wherein:
the second drive substrate comprises a second substrate and a second drive wire layer located on the second substrate;
the second substrate is made of transparent glass or transparent resin; and
a wire in the second drive wire layer has a thickness in a range of 0.3 µm to 1 µm, and the wire in the second drive wire layer has a width in a range of 3 µm to 15 µm.

10. The display device according to claim 1, wherein each of the first light sources has a greater size than each of the second light sources.

11. The display device according to claim 9, wherein an emergent surface of each of the second light sources in the each second light board in the second backlight module is parallel to the second drive substrate, such that a divergence angle of emergent light of each of the second light sources is symmetrical relative to a normal perpendicular to the second light board.

12. The display device according to claim 9, wherein the second light sources in the at least one second light board in the second backlight module are at least divided into a first type of second light source and a second type of second light source; and
each of the first type of second light source and the second type of second light source comprises:
a support electrically connected to the second drive substrate, the support being recessed towards a side of the second drive substrate to form an accommodation space; and
a light-emitting chip located in the accommodation space of the support; wherein:
a surface of the support for fixing the light-emitting chip is not parallel to the second drive substrate, such that a divergence angle of emergent light of the first type of second light source and a divergence angle of emergent light of the second type of second light source incline relative to a normal perpendicular to the second light board; and
a surface of the first type of second light source for fixing the light-emitting chip inclines towards a first side, a surface of the second type of second light source for fixing the light-emitting chip inclines towards a second side, and the first side and the second side are two opposite sides of the normal perpendicular to the second light board.

13. The display device according to claim 12, wherein the second light sources in the at least one second light board in the second backlight module further comprise a third type of second light source;
a light emergent surface of the third type of second light source is parallel to the second drive substrate, such that a divergence angle of emergent light of the third type of second light source is symmetrical relative to the normal perpendicular to the second light board.

14. The display device according to claim 13, wherein a first type of second light source, a second type of second light source and a third type of second light source constitute a second light source group, the second light board comprises a plurality of second light source groups, and the second light source groups are arranged in an array; and in a same second light source group, the third type of second light source is located between the first type of second light source and the second type of second light source.

15. The display device according to claim 9, wherein the second backlight module at least comprises two types of second light boards, that is a first type of second light board and a second type of second light board, each of second light sources of the first type of second light board is a first type of second light source, and each of second light sources of the second type of second light board is a second type of second light source; and each of the first type of second light source and the second type of second light source comprises:

a support electrically connected to the second drive substrate, the support being recessed towards a side of the second drive substrate to form an accommodation space; and a light-emitting chip located in the accommodation space of the support; wherein:

a surface of the support for fixing the light-emitting chip is not parallel to the second drive substrate, such that a divergence angle of emergent light of the first type of second light source and a divergence angle of emergent light of the second type of second light source incline relative to a normal perpendicular to the second light board; and a surface of the first type of second light source for fixing the light-emitting chip inclines towards a first side, a surface of the second type of second light source for fixing the light-emitting chip inclines towards a second side, and the first side and the second side are two opposite sides of the normal perpendicular to the second light board.

16. The display device according to claim 15, wherein the second backlight module further comprises a third type of second light board, and each of second light sources of the third type of second light board is a third type of second light source; and a light emergent surface of the third type of second light source is parallel to the second drive substrate, such that a divergence angle of emergent light of the third type of second light source is symmetrical relative to the normal perpendicular to the second light board.

17. A control method for the display device according to claim 1, comprising:

determining a brightness level of the display device selected by a user;

determining a light board to be activated according to the brightness level and a predetermined correspondence between the brightness level and the light board;

determining brightness of partitions in the light board to be activated according to brightness distribution of an image to be displayed; and driving a light source in a corresponding partition to provide backlight for the display panel according to determined brightness of the partitions.

18. The control method according to claim 17, wherein the first backlight module emits collimated light, and a divergence angle of emergent light of the second backlight module is symmetrical relative to a normal perpendicular to the second light board; and the control method further comprises:

determining a display mode of the display device selected by the user, the display mode comprising a wide-view angle display mode and a privacy display mode;

activating the first backlight module and the second backlight module simultaneously in a case that a determined display mode is the wide-view angle display mode; and activating the first backlight module and deactivating the second backlight module in a case that a determined display mode is the privacy display mode.

19. The control method according to claim 17, wherein second light sources in at least one second light board in the second backlight module are at least divided into a first type of second light source and a second type of second light source, or the second backlight module at least comprises a first type of second light board and a second type of second light board; and the control method further comprises:

determining a view angle of the display selected by the user;

determining a light source to be activated according to the view angle and a predetermined correspondence between the view angle and the light source; and turning on a determined light source to be activated to provide the backlight for the display panel.

* * * * *